United States Patent
Nalluri et al.

(10) Patent No.: US 9,626,732 B2
(45) Date of Patent: Apr. 18, 2017

(54) SUPPORTING ATOMIC OPERATIONS AS POST-SYNCHRONIZATION OPERATIONS IN GRAPHICS PROCESSING ARCHITECTURES

(71) Applicant: Intel Corporation, Santa Clara, CA (US)

(72) Inventors: Hema C. Nalluri, Hyderabad (IN); Aditya Navale, Folsom, CA (US); Altug Koker, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 257 days.

(21) Appl. No.: 14/050,626

(22) Filed: Oct. 10, 2013

(65) Prior Publication Data

US 2015/0103084 A1 Apr. 16, 2015

(51) Int. Cl.
*G06F 15/80* (2006.01)
*G06T 1/20* (2006.01)

(52) U.S. Cl.
CPC ..................................... *G06T 1/20* (2013.01)

(58) Field of Classification Search
CPC ............. G06F 12/1045; G06F 12/0862; G06F 12/0811
USPC .......................................... 345/174, 505, 522
See application file for complete search history.

(56) References Cited

U.S. PATENT DOCUMENTS

| | | | |
|---|---|---|---|
| 6,867,781 B1 | 3/2005 | Van Hook et al. | |
| 2004/0103249 A1* | 5/2004 | Lin | G06F 13/4059 711/118 |
| 2007/0234326 A1* | 10/2007 | Kejariwal | G06F 8/458 717/151 |
| 2009/0300288 A1* | 12/2009 | Lefebvre | G06F 12/0804 711/128 |
| 2010/0060630 A1* | 3/2010 | Nystad | G06T 15/40 345/419 |
| 2014/0380327 A1 | 12/2014 | Thabet et al. | |

FOREIGN PATENT DOCUMENTS

| | | |
|---|---|---|
| JP | 2002-063570 A | 2/2002 |
| JP | 2002-183750 A | 6/2002 |
| WO | 2006/123546 A1 | 11/2006 |

OTHER PUBLICATIONS

Microsoft computer dictionary, fifth edition, 2002, ISBN: 0-7356-1495-4.*
Office Action for Japanese Patent Application No. 2014-194756, mailed Sep. 29, 2015, 6 pages including 2 pages of English translation.

* cited by examiner

*Primary Examiner* — Weiming He
(74) *Attorney, Agent, or Firm* — Jordan IP Law, LLC (57) ABSTRACT

Methods and systems may provide for storing a set of post-synchronization operations to a graphics memory and sending a flush marker to a graphics pipeline. Additionally, the set of post-synchronization operations may be processed in response to the flush marker exiting the graphics pipeline. In one example, the set of post-synchronization operations includes one or more atomic operations. Moreover, the set of post-synchronization operations may be obtained from an inline portion of an atomics command.

25 Claims, 8 Drawing Sheets

SUPPORTING ATOMIC OPERATIONS AS POST-SYNCHRONIZATION OPERATIONS IN GRAPHICS PROCESSING ARCHITECTURES

BACKGROUND

In conventional graphics processing architectures, a software (SW) driver running on a central processing unit (CPU) may submit workloads to a graphics processing unit (GPU) for high performance execution. During workload execution by the GPU, "synchronization" conditions may occur as particular execution points are reached or completed, wherein such execution points may be referred to as "synchronization points". The ability of the software driver to use post-synchronization operations to track the progress made by the GPU may be limited to simple memory writes. As a result, sub-optimal performance and/or power consumption may be experienced.

BRIEF DESCRIPTION OF THE DRAWINGS

The various advantages of the embodiments will become apparent to one skilled in the art by reading the following specification and appended claims, and by referencing the following drawings, in which:

DETAILED DESCRIPTION

Figure 1:
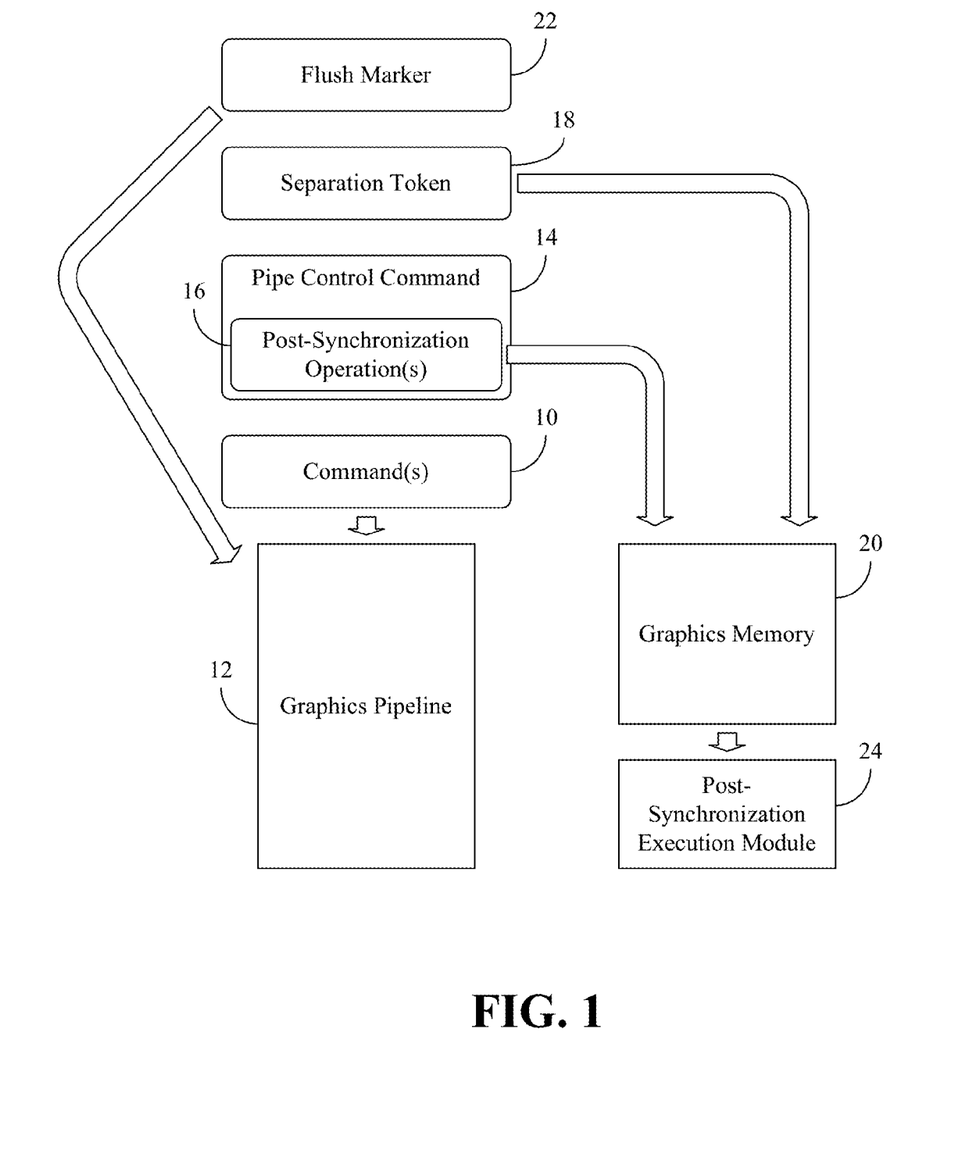
FIG. 1 is a block diagram of an example of an approach to processing commands in a graphics architecture according to an embodiment.

FIG. 1 shows an approach to processing commands in a graphics architecture. In the illustrated example, a workload represented by one or more commands 10 is sent to a graphics pipeline 12, which may be configured to execute the commands 10 in a highly parallelized and efficient manner (e.g., relative to a host processor/CPU, not shown). The commands 10 may be issued by a software driver executing on a host processor, a graphics processor containing the graphics pipeline, etc., or any combination thereof. A pipe control command 14 may also be issued (e.g., by a driver), wherein the illustrated pipe control command 14 includes an inline portion that contains a set of post-synchronization operations 16. The inline synchronization operations 16 may be any set of commands that may be programmed by a host similarly to the commands 10. In addition, the pipe control command 14 may generally be associated with a synchronization point encountered during workload execution of the commands 10. As will also be discussed in greater detail, an atomics command and/or a semaphore command (not shown) may also be used to identify the set of post-synchronization operations 16.

In the case of an atomics command being used to identify the set of post-synchronization operations 16, the atomics command may include the set of post-synchronization operations 16 as inline data or accept the set of post-synchronization operations as indirect data from one or more preloaded implicit registers. The implicit registers may be preloaded through an explicit command with inline data, from memory or from some other register. Moreover, the atomics command may support read data to be returned to the originator of the atomics command (e.g., based on a return bit in the command) and/or stored to an implicit register for further use. In one example, a graphics hardware front end either returns read data to an originator of the atomics command or stores read data to an implicit register for further use if the return bit is set.

In general, any command may be made to be a post-synchronization operation having information that is passed via a special bit in the command to make it a post-synchronization operation rather than executing it immediately. In one example, any set of commands are packed as inline data into the pipe control command 14 in order to treat them as post-synchronization operations. As will be discussed in greater detail, such an approach may result in sending a marker 22 down the graphics pipeline 12, wherein detecting a "flush done" state may cause these commands to be executed. In another example, a special bit may be set in a command (may be any command), which indicates that the command should be indicated as post-synchronization operation. Thus, when this bit is set the command may result in a marker being sent down the graphics pipeline 12 and the command being pushed into storage for execution as a post-synchronization operation upon completion of the corresponding marker's flush.

The set of post-synchronization operations 16 may be useful in tracking resources, bookkeeping, etc., with respect to the progress of the commands 10 through the graphics pipeline 12. As will be noted in greater detail, the set of post-synchronization operations 16 may include atomic operations ("atomics", e.g., read, modify and write) that perform more complex functionality than simple writes to memory. For example, logical and/or arithmetic modify operations such as, for example, Add, Subtract, Increment, Decrement, Max, Min, AND, OR, XOR, Compare, etc., may all be incorporated into an atomic operation. Thus, the illustrated approach supports atomic operations as post-synchronization operations in graphics processing architectures.

More particularly, the set of post-synchronization operations 16 may be stored to a graphics memory 20 such as, for example, local cache, register and/or first in first out (FIFO) buffer on the graphics processor, a dedicated graphics double data rate (DDR) memory module, etc. In addition, a separation token 18 may be stored to the graphics memory 20 to serve as a separator between successive pipe control commands such as the pipe control command 14. The illustrated approach also provides for sending a flush marker 22 to the graphics pipeline. Upon determining that the flush marker 22 has exited the graphics pipeline 12, a post-synchronization execution module 24 may process the set of post-synchronization operations 16 from the graphics memory 20 in a pipelined fashion. The post-synchronization execution module 24 may be either dedicated to processing the post-synchronization operations 16 or shared between the post-synchronization operations 16 and the commands 10. In the shared example, the execution module 24 may be incorporated into the hardware front end of the graphics pipeline 12, wherein the execution module 24 might multiplex between the two streams of commands.

Figure 2:
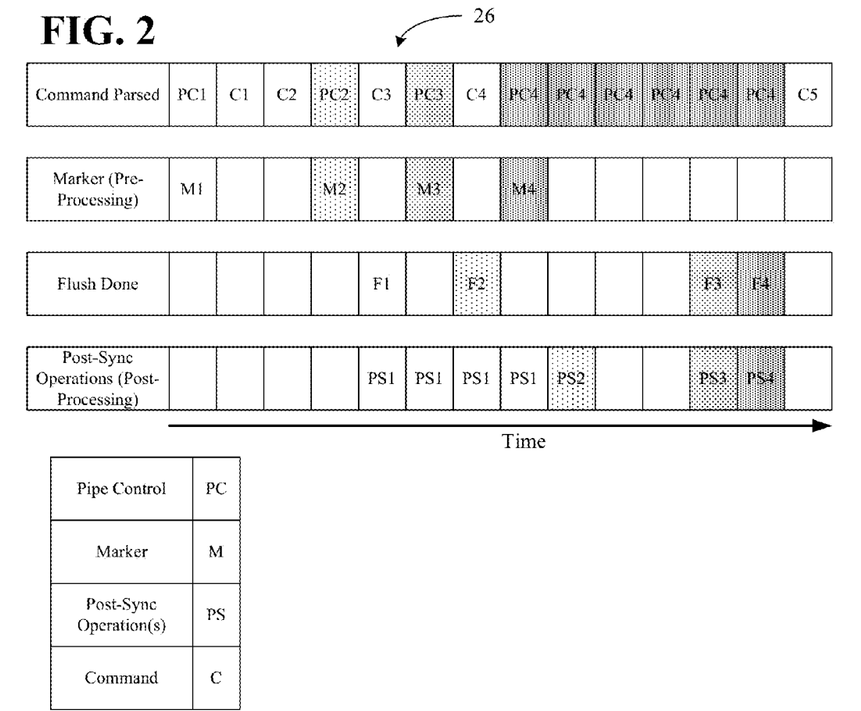
FIG. 2 is a block diagram of an example of a command sequence that involves post-synchronization operations according to an embodiment.
Figure 3:
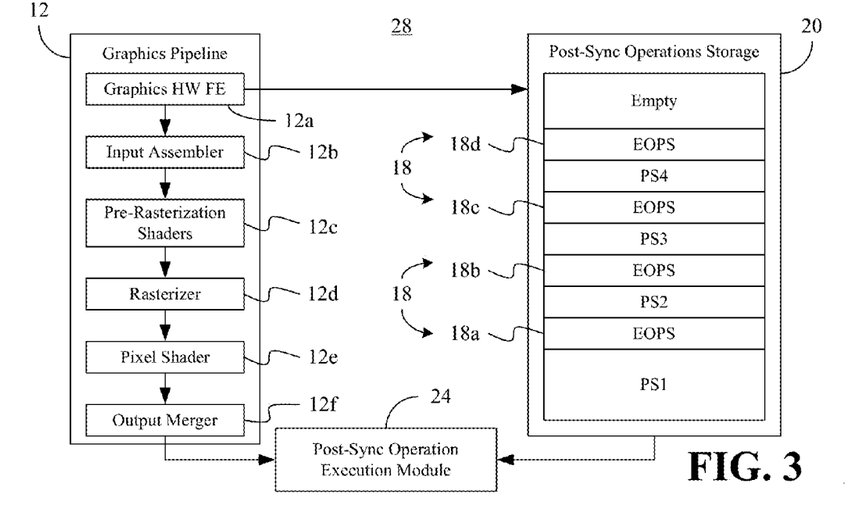
FIG. 3 is a block diagram of an example of a graphics processing architecture according to an embodiment.

FIGS. 2 and 3 show a command sequence 26 and a graphics processing architecture 28, respectively, that involve post-synchronization operations. In the illustrated example, a first pipe control command ("PC1") is parsed and a first set of post-synchronization operations ("PS1") are deferred by storing them to the graphics memory 20 (e.g., "post-sync operations storage"). As already noted, a set of post-synchronization operations may represent one or more atomic operations that are able to modify data (e.g., Add, Subtract, Increment, Decrement, Max, Min, AND, OR, XOR, Compare, and so forth). A set of post-synchronization operations may also include other, non-atomic operations (e.g., any combination of commands supported by graphics hardware). Simply put, the first set of post-synchronization operations PS 1 could be any combination of commands (e.g., C9, C10, C11 . . . , not shown). In one example, any command having a special bit indicating post-synchronization may behave the same way as if a pipe control command were programmed to include the command in question as a post-synchronization command.

In addition, a first marker ("M1") may be generated and pre-processed by the graphics pipeline 12 (12a-12f), which may include, for example, a graphics hardware (HW) front end (FE) 12a, an input assembler 12b, one or more pre-rasterization shaders 12c, a rasterizer 12d, a pixel shader 12e, an output merger stage 12f, and so forth. The architecture 28 shows that separation tokens 18 (18a-18d) may generally be stored to the graphics memory 20 after corresponding sets of post-synchronization operations. For example, an end of post-synchronization ("EOPS") separation token 18a may be stored to the graphics memory 20 after the first set of post-synchronization operations PS1 is stored to the graphics memory 20 in order to signal the end of the first set of post-synchronization operations PS1.

The illustrated command sequence 26 also demonstrates that a first command ("C1") may also be parsed and processed by the graphics pipeline 12, followed by a second command ("C2"). A second pipe control command ("PC2") may then be parsed, wherein a second set of set of post-synchronization operations ("PS2") may be deferred by storing them to the graphics memory 20, along with another EOPS separation token 18b. Again, the second set of post-synchronization operations PS2 could be any combination of commands (e.g., C12, not shown). Additionally, a second marker ("M2") may be generated and pre-processed by the graphics pipeline 12. In the illustrated example, a third command ("C3") is parsed and processed by the graphics pipeline 12 and a first flush indicator ("F1") is generated when the first marker M1 exits the output merger stage 12f of the graphics pipeline 12. In response to detecting the first flush indicator F1, the execution module 24 may begin post-processing the first set of post-synchronization operations PS1 from the graphics memory 20, wherein post-processing the first set of post-synchronization operations PS1 may be discontinued upon encountering the EOPS separation token 18a in the graphics memory 20.

Additionally, the illustrated command sequence 26 demonstrates that a third pipe control command ("PC3") may then be parsed, wherein a third set of post-synchronization operations ("PS3") may be deferred by storing them to the graphics memory 20, along with an associated EOPS separation token 18c. Moreover, a third marker ("M3") may be generated and pre-processed by the graphics pipeline 12. In the illustrated example, a fourth command ("C4") is parsed and processed by the graphics pipeline 12 and a second flush indicator ("F2") signals to the execution module 24 that the second marker M2 has exited the output merger stage 12f of the graphics pipeline 12. Accordingly, the illustrated execution module 24 post-processes the second set of post-synchronization operations PS2 in response to the second marker M2 exiting the graphics pipeline 12 (e.g., once post-processing of the first set of post-synchronization operations PS1 has completed).

In addition, a fourth pipe control command ("PC4") may be parsed, wherein a fourth set of post-synchronization operations ("PS4") may be deferred by storing them to the graphics memory 20, along with another EPOS separation token 18d. A fourth marker ("M4") may also be generated and pre-processed by the graphics pipeline 12. The illustrated pipe control command PC4 may function as a "stalling" command that waits for its corresponding fourth set of post-synchronization operations PS4 to be completed before moving to the next command (i.e., "C5"). Thus, in the illustrated example, a "bubble" is intentionally inserted into the pipeline 12 until a third flush indicator ("F3") is detected. The third flush indicator F3, which may be generated in response to the third marker M3 exiting the graphics pipeline 12, may trigger post-processing of the third set of post-synchronization operations PS3 by the execution module 24. Similarly, when the fourth marker M4 exits the graphics pipeline 12, a fourth flush indicator F4 may cause the execution module 24 to post-process the fourth set of post-synchronization operations PS4.

Figure 4:
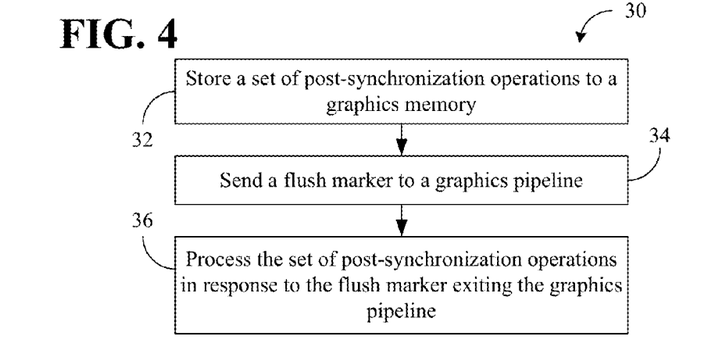
FIG. 4 is a flowchart of an example of a method of processing post-synchronization operations according to an embodiment.

Turning now to FIG. 4, a method 30 of processing post-synchronization operations is shown. The method 30 may be implemented in executable software as a set of logic instructions stored in a machine- or computer-readable storage medium of a memory such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Illustrated processing block 32 provides for storing a set of post-synchronization operations to a graphics memory. As already noted, block 32 may also involve storing a separation token to the graphics memory after the set of post-synchronization operations is stored to the graphics memory. Additionally, a flush marker may be sent to a graphics pipeline at block 34, wherein the set of post-synchronization operations may be processed at block 36 in response to the flush marker exiting the graphics pipeline.

Figure 5A:
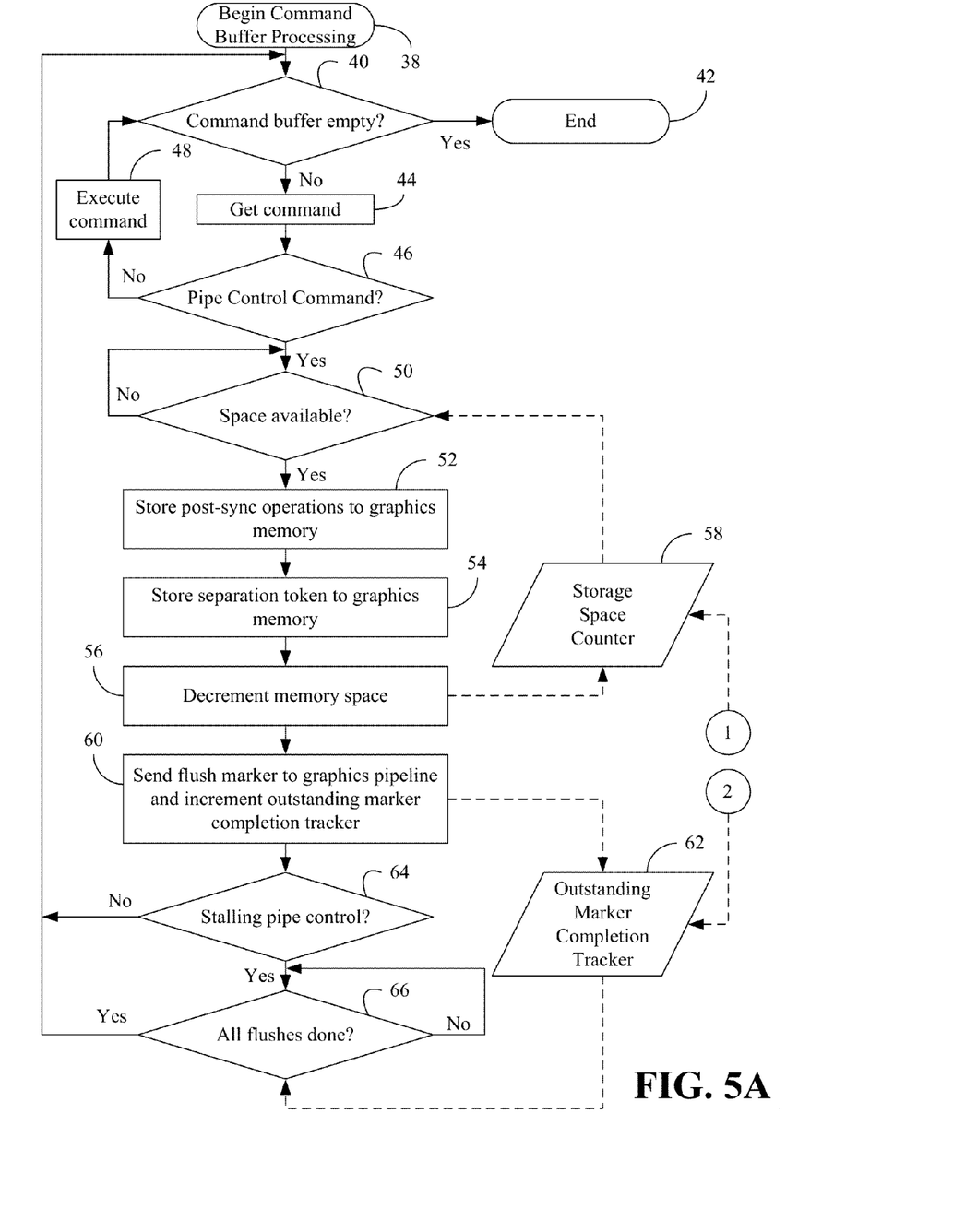
FIGS. 5A-5C are flowcharts of examples of pre-processing, post-processing and atomics processing commands, respectively, according to an embodiment.
Figure 5B:
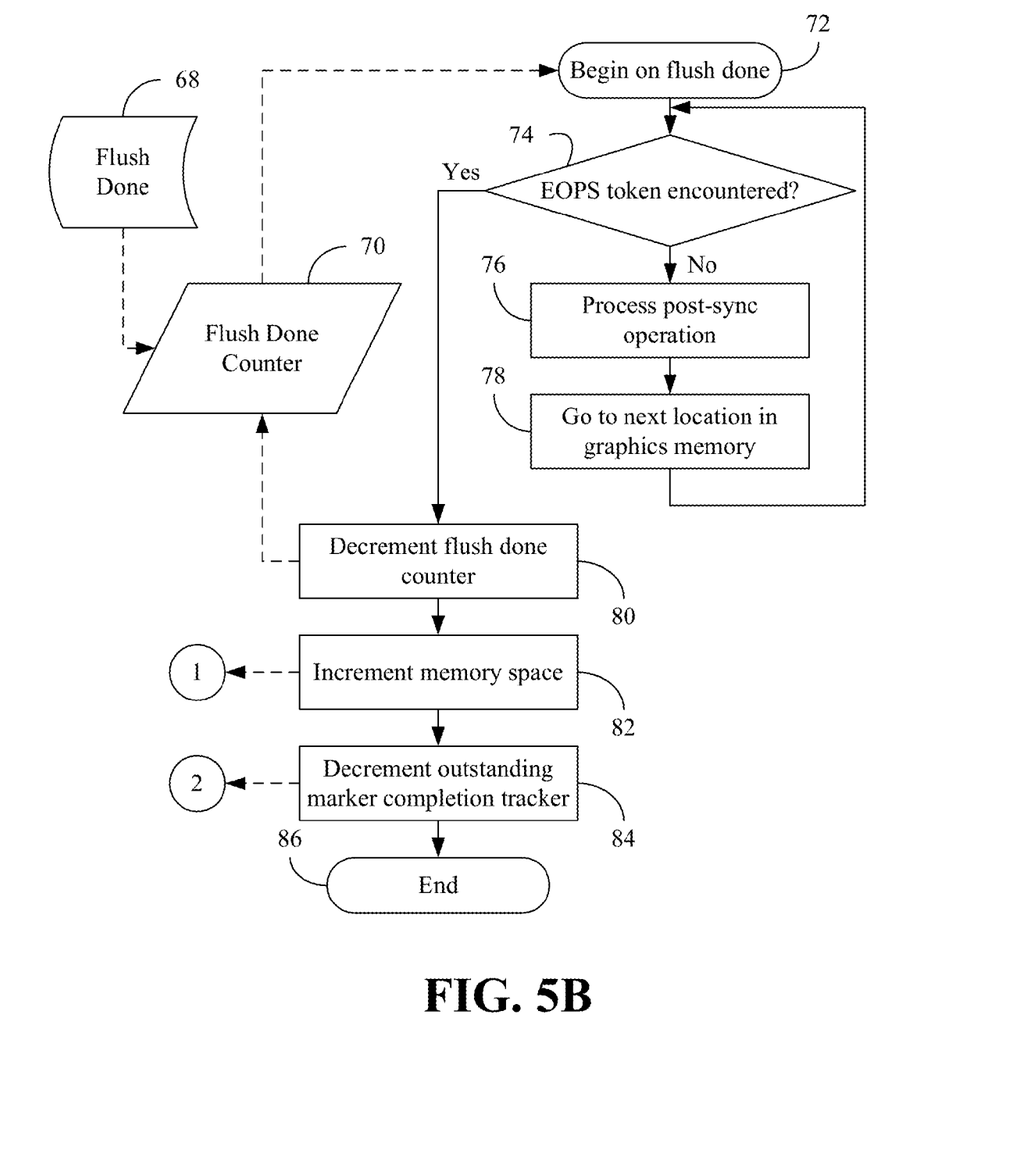
Figure 5C:
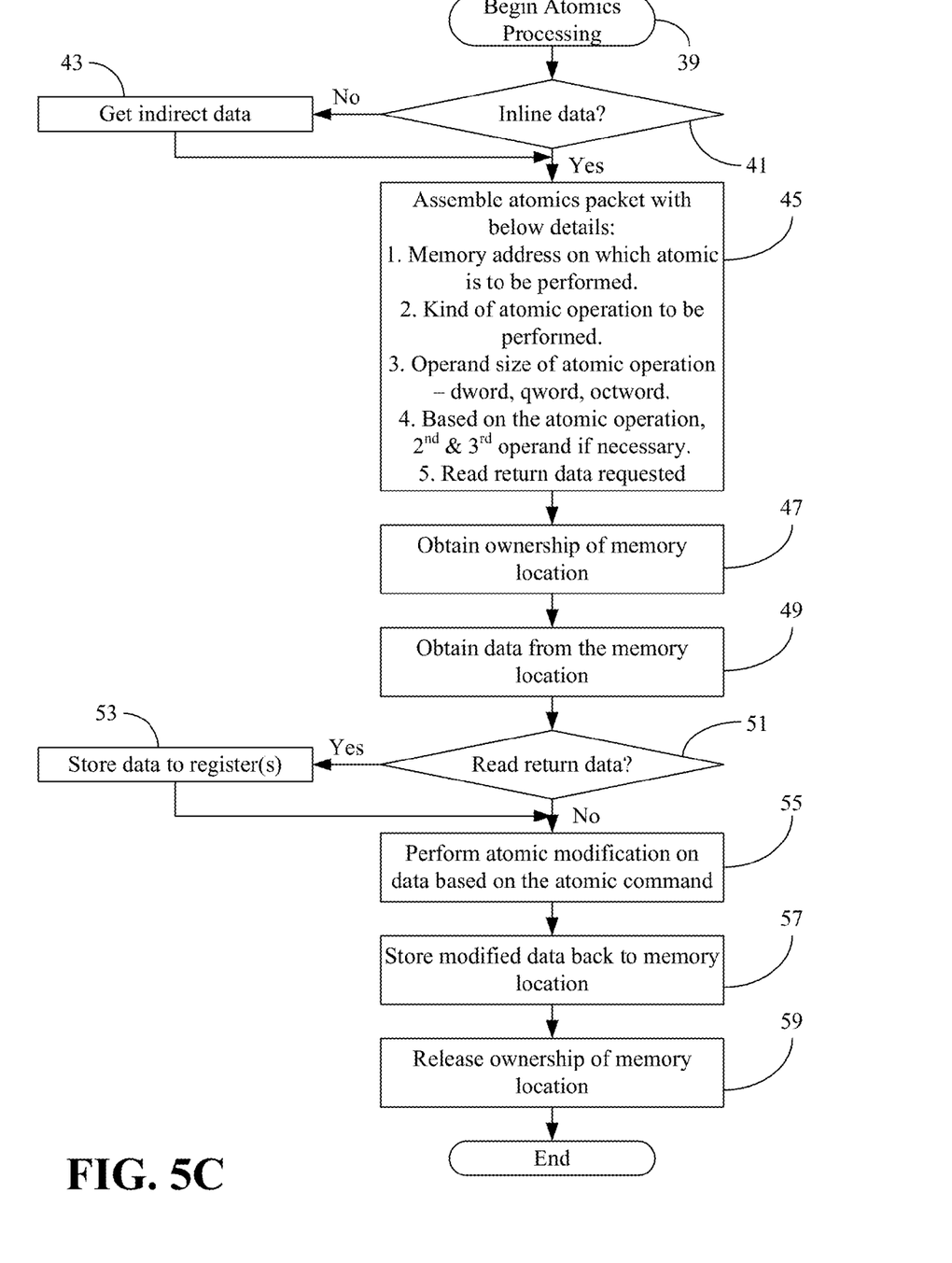

FIGS. 5A-5C show more detailed approaches to pre-processing, post-processing and atomics processing commands, respectively. The illustrated approaches may be implemented in executable software as a set of logic instructions stored in a machine- or computer-readable storage medium of a memory such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

As best shown in FIG. 5A, illustrated processing block 38 begins command buffer processing, wherein a determination may be made at block 40 as to whether the command buffer is empty. If so, the process may end at block 42. Otherwise, illustrated block 44 retrieves the next command from the buffer and a determination may be made at block 46 as to whether the retrieved command is a pipe control command. As already noted, another command such as, for example, an appropriately configured atomics command or semaphore command may also be used instead of and/or in addition to the pipe control command. Indeed, any command supported by hardware may be configured to be considered as being a post-synchronization operation. If the retrieved command is not a pipe command, illustrated block 48 executes the command and another buffer check is conducted at block 40.

If the command is a pipe control command, block 50 may determine whether space is available in a graphics memory such as, for example, the graphics memory 20 (FIGS. 1 and 3). If not, the illustrated pre-processing procedure waits until sufficient memory space frees up. Otherwise, a set of post-synchronization operations may be parsed from the pipe control command and stored to the graphics memory at block 52, and a separation token may be generated and stored to the graphics memory at block 54. Alternatively, software may ensure that a given single pipe control command does not have post-synchronization operations that exceed available storage space by splitting post-synchronization operations across multiple pipe control commands if the available storage space is exceeded. In such a case, the determination at block 50 might be bypassed.

Illustrated block 56 interfaces with a storage space counter 58 to decrement the available amount of memory space based on the size of the set of post-synchronization operations and the size of the tokens. In addition, a flush marker may be sent to the graphics pipeline at block 60, which may also involve incrementing an outstanding marker completion tracker 62. A determination may be made at block 64 as to whether the command is a stalling pipe control command. If not, the pre-processing procedure may return to block 40 to perform another buffer check. Otherwise, a determination may be made at block 66 as to whether all flushes have completed based on information from the outstanding marker completion tracker 62. The determination at block 66 may repeat until all flushes have completed.

As best shown in FIG. 5B, upon encountering a flush indicator at block 68 (e.g., when a marker exits the graphics pipeline), a flush done counter 70 may be incremented, which begins the illustrated post-processing procedure at block 72. A determination may be made at block 74 as to whether an EOPS separation token has been encountered in the graphics memory. If not, illustrated block 76 processes the next post-synchronization ("post-sync") operation in the graphics memory and block 78 may proceed to the next location in the graphics memory.

If an EOPS token is encountered in the graphics memory, illustrated block 80 decrements the flush done counter 70 and the memory space is incremented in the storage space counter 58 (FIG. 5A) at block 82 based on the size of the post-sync operations and token removed from the graphics memory. In addition, the outstanding marker completion tracker 62 (FIG. 5A) may be decremented at block 84, wherein the illustrated post-processing procedure may terminate at block 86. Thus, the pre-processing procedure of FIG. 5A and the post-processing procedure of FIG. 5B are decoupled from one another, in the example shown.

As best shown in FIG. 5C, a graphics hardware front end such as the graphics HW FE 12a (FIG. 3) may generally prepare atomics commands for immediate processing if the atomics commands do not have a special bit indication corresponding to post-synchronization processing (e.g., a post-synchronization bit is not set). More particularly, atomics processing may begin at block 39, wherein illustrated block 41 determines whether a received atomics command contains inline data. If not, block 43 may get indirect data from an appropriate source (e.g., register, buffer, etc.). Additionally, an atomics packet may be assembled at block 45, wherein the atomics packet may include, for example, the memory address on which the atomic operation is to be performed, the kind of atomic operation to be performed, the operand size of the atomic operation (e.g., dword, qword, octword), additional operations (e.g., $2^{nd}$ and $3^{rd}$ operands, depending upon the atomic operation), read return data requested, and so forth.

Illustrated block 47 provides for obtaining ownership of the memory location, wherein ownership may ensure that no other processes and/or devices may modify the memory location, and block 49 may obtain data from the memory location. A determination may be made at block 51 as to whether read return data has been requested. If so, the data obtained from memory may be stored to one or more registers at block 53. An atomic modification may be performed at block 55 based on the atomic command, wherein illustrated block 57 provides for storing the modified data back to the memory location. Block 59 may release ownership of the memory location.

Figure 6:
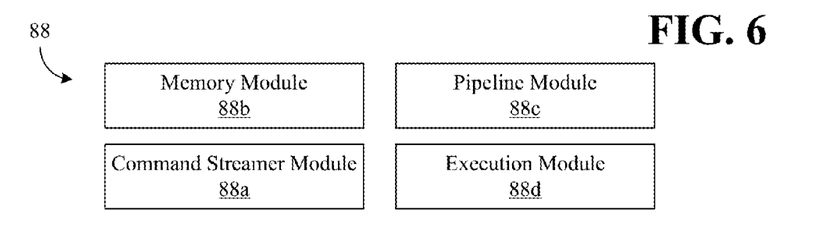
FIG. 6 is a block diagram of an example of a logic architecture according to an embodiment.

Turning now to FIG. 6, a logic architecture 88 (88a-88d) is shown. The logic architecture 88 may generally be implemented in a graphics hardware (HW) front end (FE) such as, for example, the graphics HW FE 12a (FIG. 3), already discussed. In the illustrated example, the architecture 88 includes a command streamer (CS) module 88a (e.g., render, blitter, video and/or video enhancement command streamer interface) that obtains sets of post-synchronization operations from a pipe control command, an atomics command, a semaphore command, etc., or any combination thereof. A memory module 88b may store the sets of post-synchronization operations to a graphics memory, wherein a pipeline module 88c may send a flush marker to a graphics pipeline for each set of post-synchronization operations. Moreover, an execution module 88d may process each set of post-synchronization operations in response to a corresponding flush marker exiting the graphics pipeline. The execution module 88d may therefore function similarly to the post-sync operation execution module 24 (FIGS. 1 and 3), already discussed.

Figure 7:
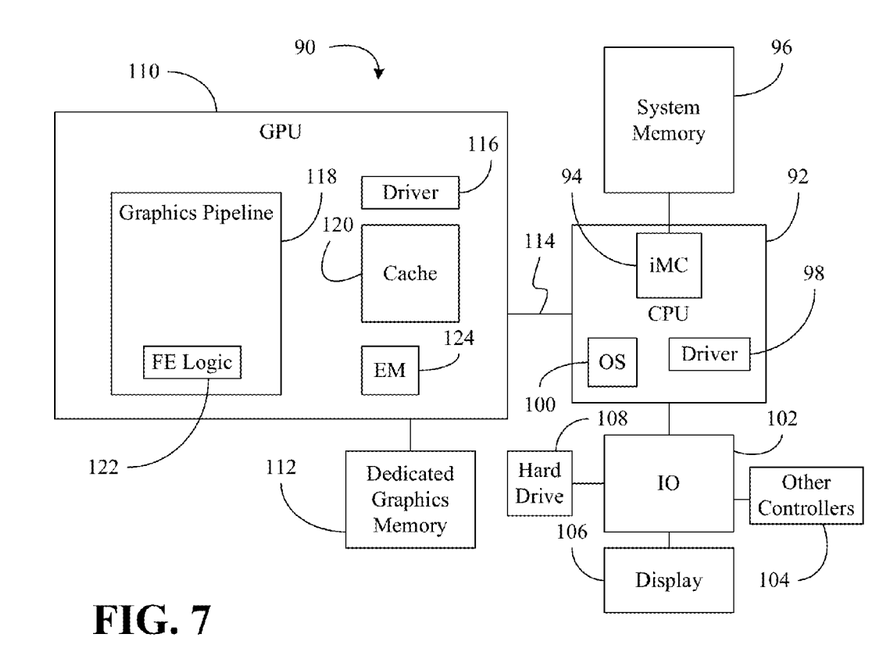
FIG. 7 is a block diagram of an example of a system according to an embodiment.

Turning now to FIG. 7, a computing system 90 is shown, wherein the system 90 may be part of a mobile platform such as a laptop, mobile Internet device (MID), personal digital assistant (PDA), media player, imaging device, etc., any smart device such as a smart phone, smart tablet, smart TV (television) and so forth, or any combination thereof. The system 90 may also be part of a fixed platform such as a personal computer (PC), server, workstation, etc. The illustrated system 90 includes a central processing unit (CPU, e.g., host processor) 92 with an integrated memory controller (iMC) 94 that provides access to system memory 96, which could include, for example, double data rate (DDR) synchronous dynamic random access memory (SDRAM, e.g., DDR3 SDRAM JEDEC Standard JESD79-3C, April 2008) modules. The modules of the system memory 96 may be incorporated, for example, into a single inline memory module (SIMM), dual inline memory module (DIMM), small outline DIMM (SODIMM), and so on.

The CPU 92 may also have one or more drivers 98 and/or processor cores (not shown), where each core may be fully functional with instruction fetch units, instruction decoders, level one (L1) cache, execution units, and so on. In one example, the drivers 98 are configured to issue a set of post-synchronization operations in a pipe control command, an atomics command, a semaphore command, and so forth. The CPU 92 could alternatively communicate with an off-chip variation of the iMC 94, also known as a Northbridge, via a front side bus or a point-to-point fabric that interconnects each of the components in the system 90. The CPU 92 may also execute an operating system (OS) 100.

The illustrated CPU 92 communicates with an input/output (IO) module 102, also known as a Southbridge, via a bus. The iMC 94/CPU 92 and the IO module 102 are sometimes referred to as a chipset. The CPU 92 may also be operatively connected to a network (not shown) via a network port through the IO module 102 and various other controllers 104. Thus, the other controllers 104 could provide off-platform communication functionality for a wide variety of purposes such as wired communication or wireless communication including, but not limited to, cellular telephone (e.g., Wideband Code Division Multiple Access, W-CDMA (Universal Mobile Telecommunications System/UMTS), CDMA2000 (IS-856/IS-2000), etc.), Wi-Fi (Wireless Fidelity, e.g., Institute of Electrical and Electronics Engineers/IEEE 802.11, 2007 Edition), Bluetooth (e.g., IEEE 802.15.1-2005, Wireless Personal Area Networks), WiMax (e.g., IEEE 802.16-2004), Global Positioning System (GPS), spread spectrum (e.g., 900 MHz), and other radio frequency (RF) telephony purposes. The IO module 102 may also communicate with a display 106 to provide for the visual output/presentation of video, images, and other content. The other controllers 104 could also communicate with the IO module 102 to provide support for user interface devices (not shown) such as a keypad, mouse, etc., in order to allow a user to interact with and perceive information from the system 90.

The IO module 102 may also have internal controllers (not shown) such as USB (Universal Serial Bus, e.g., USB Specification 2.0, USB Implementers Forum), Serial ATA (SATA, e.g., SATA Rev. 3.0 Specification, May 27, 2009, SATA International Organization/SATA-IO), High Definition Audio, and other controllers. The illustrated IO module 102 is also coupled to storage, which may include a hard drive 108, read only memory (ROM), optical disk, flash memory (not shown), etc.

The illustrated system 90 also includes a dedicated graphics processing unit (GPU, graphics processor) 110 coupled to a dedicated graphics memory 112. The dedicated graphics memory 112 could include, for example, GDDR (graphics DDR) or DDR SDRAM modules, or any other memory technology suitable for supporting graphics rendering. The GPU 110 and graphics memory 112 might be installed on a graphics/video card, wherein the GPU 110 may communicate with the CPU 92 via a graphics bus 114 such as a PCI Express Graphics (PEG, e.g., Peripheral Components Interconnect/PCI Express x16 Graphics 150W-ATX Specification 1.0, PCI Special Interest Group) bus, or Accelerated Graphics Port (e.g., AGP V3.0 Interface Specification, September 2002) bus. The graphics card may be integrated onto the system motherboard, into the main CPU 92 die, configured as a discrete card on the motherboard, etc. The GPU 110 may also execute one or more drivers 116, and may include a graphics pipeline 118 and an internal cache 120 to store instructions and other data.

Alternatively, the GPU 110 may lack a dedicated graphics memory and instead share the system memory 96 with the CPU 92. Such a configuration might be used for integrated graphics architectures in which the GPU 110 and the CPU 92 are part of the same die (e.g., and connected through an appropriate interface).

The illustrated graphics pipeline 118 includes front end (FE) logic 122 that is configured to function similarly to the logic architecture 88 (FIG. 6), already discussed. Thus, the FE logic 122 may store a set of post-synchronization operations to a graphics memory such as, for example, the cache 120 and/or dedicated graphics memory 112 and send a flush marker to the remainder of the graphics pipeline 118, wherein the set of post-synchronization operations are associated with the content presented on the display 106. The GPU 110 may also include an execution module 124 configured to process the set of post-synchronization operations in response to the flush marker exiting the graphics pipeline 118.

An example specification for an atomic command ("MI_ATOMIC") is shown below in Table I, wherein the atomic command may be configured to include post-synchronization operations as inline data.

TABLE I

| MI_ATOMIC |
|---|
| MI_ATOMIC is used to carry atomic operation on data in graphics memory. Atomic operations are supported on data granularity of 4 B, 8 B and 16 B. The atomic operation leads to a read-modify-write operation on the data in graphics memory with the option of returning values. The data in graphics memory is modified by doing arithmetic and logical operation with the inline/indirect data provided with the MI_ATOMIC command. Inline/Indirect data provided in the command can be one or two operands based on the atomic operation. Ex: Atomic-Compare operation uses two operands while Atomic-Add operation uses a single operand and Atomic-increment requires no operand. Atomic operations can be enabled to return values by setting a "Return Data Control" field in the command, wherein return data is stored to a command streamer general purpose register (CS_GPR). |
| CS_GPR4/5 registers are updated with memory Return Data based on the "Data Size". Each GPR register is qword in size and occupies two MMIO (memory mapped input output) registers. |
| Note: Any references to CS_GPR registers in the command should be understood as the CS_GPR registers belonging to the corresponding render, video, blitter and/or video enhancement CS_GPR registers. |
| When "Data Size" is DWORD the lower dword of CS_GPR4 (Qword) is updated with the dword data returned from memory. |
| When "Data Size" is QWORD, only CS_GPR4 (Qword) is updated with the qword data returned from memory. |

TABLE I-continued

MI_ATOMIC

When the data size is OCTWORD CS_GPR4/5, are updated with the OCTWORD data returned from memory. CS_GPR4 is loaded with lower qword returned from memory and CS_GPR5 is loaded with upper qword returned from memory.
Indirect Source Operands:
Operand1 is sourced from {CS_GPR1, CS_GPR0}
Operand2 is sourced from {CS_GPR3, CS_GPR2}
Read return Data is stored in {CS_GPR_5, CS_GPR4}

| DWord | Bit | Description |
|---|---|---|
| 0 | 31:23 | Command HeaderType |
| | 22 | Memory Type |
| | | This bit will be ignored and treated as if clear when executing from a non-privileged batch buffer. It is allowed for this bit to be clear when executing this command from a privileged (secure) batch buffer. This bit is 1 if the Per Process Graphics Translation Table (GTT) Enable bit is clear. |
| | | Value: 0 h; Name: Per Process Graphics Address |
| | | Value: 1 h; Name: Global Graphics Address; Description: This command will use the global GTT to translate the Address and this command is executing from a privileged (secure) batch buffer. |
| | 21 | Post-Sync Operation |
| | | Value: 0 h; Name: No Post-sync Operation; Description: Command is executed as usual. |
| | | Value: 1 h; Post-sync Operation; Description: MI_ATOMIC command is executed as a pipelined PIPE_CONTROL flush command with Atomic operation as post-sync operation. Flush completion only guarantees the workload prior to this command is pushed and completion of any outstanding flushes issued prior to this command. When this bit set following restrictions apply to atomic operation: |
| | | Programming Notes |
| | | Any desired pipeline flush operation can be achieved by programming PIPE_CONTROL command prior to this command. |
| | | When this bit is set Command Streamer sends a flush down the pipe and the atomic operation is saved as post-sync operation. The command streamer goes on executing the following commands. An atomic operation saved as a set of post-sync operations is executed at some point later on completion of corresponding flush issued. |
| | | When this bit is set an atomic semaphore signal operation may be out of order with rest of the MI commands programmed in the ring buffer or batch buffer, but it may be in order with respect to the post-sync operations resulting due to PIPE_CONTROL command. |
| | 20:19 | Data Size |
| | | This field indicates the size of the operand in dword/qword/octword on which atomic operation will be performed. Data size matches with the Atomic Opcode. Operation Data size could be 4 B, 8 B or 16 B |
| | | Value: 0 h; Name: DWORD; Description: Operand size used by Atomic Operation is DWORD. |
| | | Value: 1 h; Name: QWORD; Description: Operand Size used by Atomic Operation is QWORD. |
| | | Value: 2 h; Name: OCTWORD; Description: Operand Size used by Atomic Operation is OCTWORD. |
| | | Value: 3 h; Name: RESERVED |
| | 18 | Inline Data |
| | | This bit when set indicates the source operands are provided inline within the command. When reset, the source operands are in CS_GPR registers. |
| | | Programming Notes |
| | | CS_GPR registers are programmed with appropriate values before issuing MI_ATOMIC command with this field reset. |
| | 17 | CS Stall |
| | | This bit when set command stream waits for completion of this command before executing the next command. |
| | | Programming Notes |
| | | Render Command Streamer Only: CS will not guarantee atomic operation to be complete upon setting this bit along with post-sync operation set. When post-sync operation is set, this bit has no significance. |
| | 16 | Return Data Control |
| | | When Return Data Control is set, the read return feature will be enabled during the atomic operation. |
| | | Data is stored in CS_GPR5/4 registers unconditionally on completion of the atomic operation. |
| | | On data return, CS_GPR5/4 Registers are updated based on the "Data Size" field. |
| | | When "Data Size" is DWORD lower dword of CS_GPR4 (Qword) is updated with the dword data returned from memory. |
| | | When "Data Size" is QWORD only CS_GPR4 (Qword) is updated |

TABLE I-continued

MI_ATOMIC

| | | |
|---|---|---|
| | | with the qword data returned from memory.<br>When the data size is OCTWORD CS_GPR4/5 are updated with the OCTWORD data returned from memory. CS_GPR4 is loaded with lower qword returned from memory and CS_GPR5 is loaded with upper qword returned from memory. |
| | 15:8 | Atomic Opcode<br>This field selects the kind of atomic operation to be performed. |
| | 7:0 | DWord Length<br>Default Value: 1 h<br>Format: =n<br>Total Length - 2. Excludes DWord (0, 1). |
| 1..2 | 63:0 | Memory Address<br>This field contains the graphics memory address of the data on which atomic operation is to be performed. Atomic operation can be performed on data granularity of 4 B, 8 B or 16 B and hence the Address has to be correspondingly aligned to 4 B, 8 B or 16 B respectively. |
| 3..10 | 31:0 | Operand 1 Data Dword 0/12/3, Operand 1 Data Dword 0/12/3 Dword0 of Operand 1 when Inline Data mode is set. |

Figure 8:
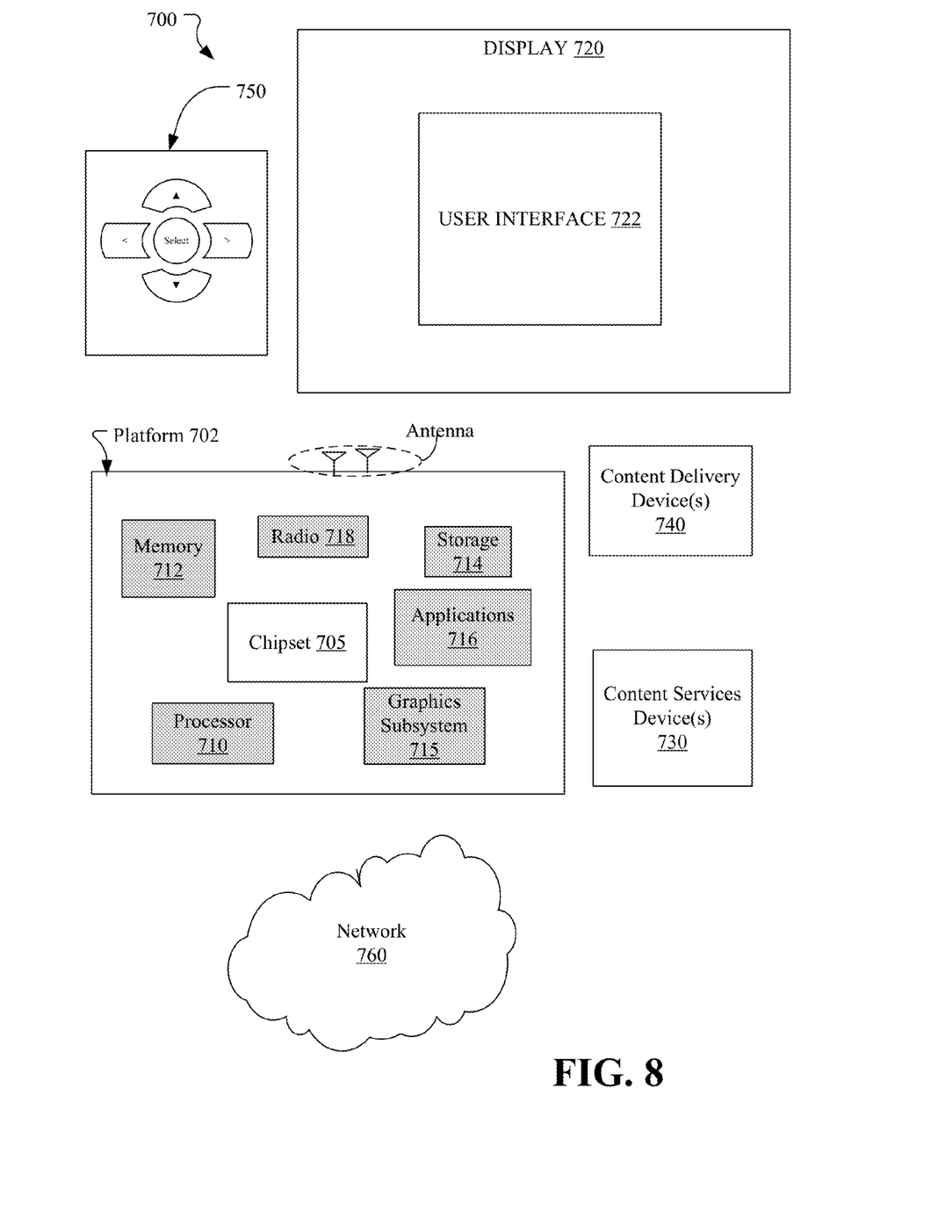
FIG. 8 is a block diagram of an example of a system having a navigation controller according to an embodiment.

FIG. 8 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth. Thus, the system 700 may be used to render images as described herein.

In embodiments, the system 700 comprises a platform 702 coupled to a display 720. Platform 702 may receive video bitstream content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. The graphics subsystem 715 may therefore include the GPU 110 (FIG. 7), already discussed. In addition, the processor 710 may be configured to operate as the CPU 92 (FIG. 7), already discussed, via instructions obtained from the memory 712, the storage 714 or other suitable source. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television.

Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off" In addition, chipset 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the embodiments.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
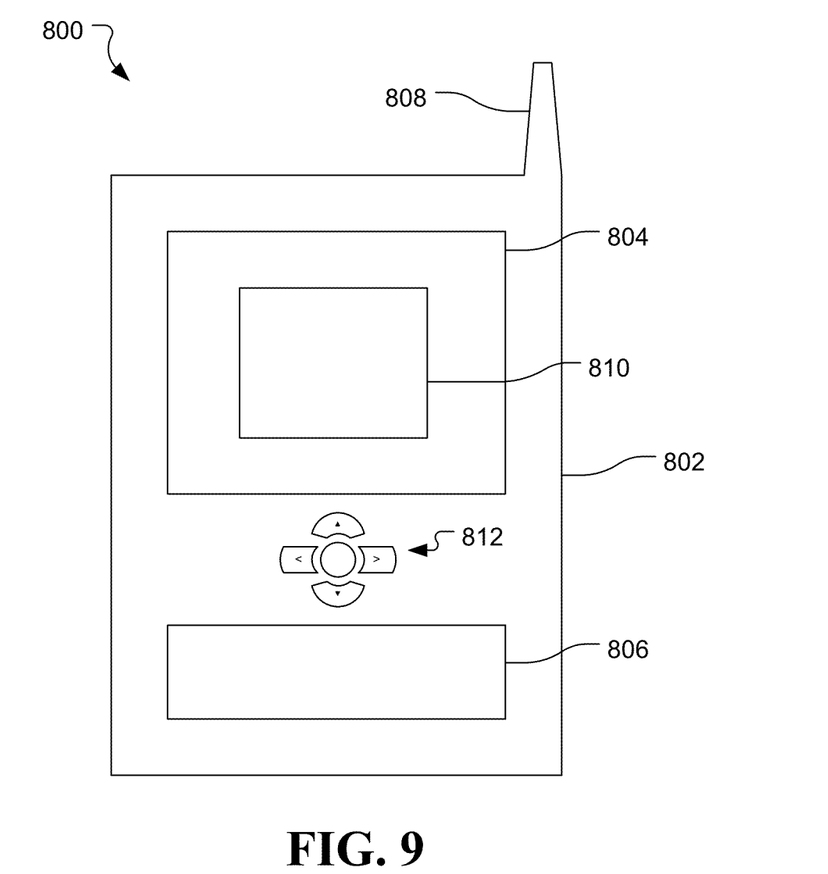
FIG. 9 is a block diagram of an example of a system having a small form factor according to an embodiment.

As described above, system 700 may be embodied in varying physical styles or form factors. FIG. 9 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Additional Notes and Examples

Example 1 may include a system to process commands, comprising a display to present visual content a host processor to execute a driver, the driver to issue a set of post-synchronization operations associated with the visual content. The system may also include a graphics memory and a graphics processor including a memory module to store the set of post-synchronization operations to the graphics memory, a pipeline module to send a flush marker to a graphics pipeline, and an execution module to process the set of post-synchronization operations in response to the flush marker exiting the graphics pipeline.

Example 2 may include the system of Example 1, wherein the memory module is to store a token to the graphics memory after the set of post-synchronization operations is stored to the graphics memory, and the execution module is to discontinue processing of the set of post-synchronization operations if the token is encountered in the graphics memory.

Example 3 may include the system of Example 1, wherein the graphics processor further includes a graphics hardware front end to obtain the set of post-synchronization operations from one of a pipe control command or an atomics command.

Example 4 may include the system of Example 3, wherein the atomics command is to either include the set of post-synchronization operations as inline data or accept the set of post-synchronization operations as indirect data from one or more preloaded implicit registers.

Example 5 may include the system of Example 3, wherein the atomics command is to include a return bit and the graphics hardware front end is to either return read data to an originator of the atomics command or store read data to an implicit register if the return bit is set.

Example 6 may include the system of Example 1, wherein the graphics processor further includes a command streamer module to consider one or more commands having a special bit indication as being the set of post-synchronization operations.

Example 7 may include the system of any one of Examples 1 to 6, wherein the set of post-synchronization operations is to include one or more atomic operations.

Example 8 may include the system of Example 7, wherein the one or more atomic operations is to include a read operation, a modify operation and a write operation.

Example 9 may include the system of Example 8, wherein the modify operation is to include one or more of an Add, Subtract, Increment, Decrement, Max, Min, AND, OR, XOR, or Compare operation.

Example 10 may include a method of processing commands, comprising storing set of post-synchronization operations to a graphics memory, sending a flush marker to a graphics pipeline, and processing the set of post-synchronization operations in response to the flush marker exiting the graphics pipeline.

Example 11 may include the method of Example 10, further including storing a token to the graphics memory after the set of post-synchronization operations is stored to the graphics memory, and discontinuing processing of the set of post-synchronization operations if the token is encountered in the graphics memory.

Example 12 may include the method of Example 10, further including obtaining the set of post-synchronization operations from one of a pipe control command or an atomics command.

Example 13 may include at least one computer readable storage medium comprising a set of instructions which, if executed by a computing device, cause the computing device to perform the method of Example 7.

Example 14 may include the at least one computer readable storage medium of Example 13, wherein the instructions, if executed, cause a computing device to store a token to the graphics memory after the set of post-synchronization operations is stored to the graphics memory, and discontinue processing of the set of post-synchronization operations if the token is encountered in the graphics memory.

Example 15 may include the at least one computer readable storage medium of Example 13, wherein the instructions, if executed, cause a computing device to obtain the set of post-synchronization operations from one of a pipe control command or an atomics command.

Example 16 may include an apparatus to process commands, comprising a memory module to store a set of post-synchronization operations to a graphics memory, a pipeline module to send a flush marker to a graphics pipeline, and an execution module to process the set of post-synchronization operations in response to the flush marker exiting the graphics pipeline.

Example 17 may include the apparatus of Example 16, wherein the memory module is to store a token to the graphics memory after the set of post-synchronization operations is stored to the graphics memory, and the execution module is to discontinue processing of the set of post-synchronization operations if the token is encountered in the graphics memory.

Example 18 may include the apparatus of Example 16, further including a command streamer module to obtain the set of post-synchronization operations from one of a pipe control command or an atomics command.

Example 19 may include the apparatus of Example 18, wherein the atomics command is to either include the set of post-synchronization operations as inline data or accept the set of post-synchronization operations as indirect data from one or more preloaded implicit registers.

Example 20 may include the apparatus of Example 18, wherein the atomics command is to include a return bit and the graphics hardware front end is to either return read data to an originator of the atomics command or store read data to an implicit register if the return bit is set.

Example 21 may include the apparatus of Example 16, wherein the graphics processor further includes a command streamer module to consider one or more commands having a special bit indication as being the set of post-synchronization operations.

Example 22 may include the apparatus of any one of Examples 16 to 21, wherein the set of post-synchronization operations is to include one or more atomic operations.

Example 23 may include the apparatus of Example 22, wherein the one or more atomic operations is to include a read operation, a modify operation and a write operation.

Example 24 may include the apparatus of Example 23, wherein the modify operation is to include one or more of an Add, Subtract, Increment, Decrement, Max, Min, AND, OR, XOR, or Compare operation.

Example 25 may include the apparatus of Example 16, further including a graphics hardware front end to prepare an atomics command for immediate processing if the atomics command does not have a special bit indication corresponding to post-synchronization processing.

Example 26 may include an apparatus to process commands, comprising means for performing the method of any one of Examples 10 to 12.

Techniques described herein may therefore provide atomics support from a graphics hardware front end and provide the capability to modify a data element by any hardware graphics component and host processor software concurrently. Such an approach may optimize and simplify driver overhead with respect to the synchronization of data between different hardware agents and software. In turn, a more efficient hardware-software interface may be achieved, as well as substantial power savings.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
    a display to present visual content;
    a host processor to execute a driver, the driver to issue a set of post-synchronization operations associated with the visual content;
    a graphics memory; and
    a graphics processor including:
        a memory module to store the set of post-synchronization operations to the graphics memory;
        a graphics pipeline to generate and pre-process a marker, and to issue a flush indicator when the marker exits the graphics pipeline; and
        an execution module to process the set of post-synchronization operations in response to the flush indicator signaling to the execution module that the marker has exited the graphics pipeline, wherein the set of post-synchronization operations are to be processed after one or more synchronization points of workload are to be reached or completed during workload processing.

2. The system of claim 1, wherein the memory module is to store a token to the graphics memory after the set of post-synchronization operations is stored to the graphics memory, and the execution module is to discontinue processing of the set of post-synchronization operations if the token is encountered in the graphics memory.

3. The system of claim 1, wherein the graphics processor further includes a graphics hardware front end to obtain the set of post-synchronization operations from one of a pipe control command or an atomics command.

4. The system of claim 3, wherein the atomics command is to either include the set of post-synchronization operations as inline data or accept the set of post-synchronization operations as indirect data from one or more preloaded implicit registers.

5. The system of claim 3, wherein the atomics command is to include a return bit and the graphics hardware front end is to either return read data to an originator of the atomics command or store read data to an implicit register if the return bit is set.

6. The system of claim 1, wherein the graphics processor further includes a graphics hardware front end to consider one or more commands having a special bit indication as being the set of post-synchronization operations.

7. The system of claim 1, wherein the set of post-synchronization operations is to include one or more atomic operations.

8. The system of claim 7, wherein the one or more atomic operations is to include a read operation, a modify operation and a write operation.

9. The system of claim 8, wherein the modify operation is to include one or more of an Add, Subtract, Increment, Decrement, Max, Min, AND, OR, XOR, or Compare operation.

10. A method comprising:
    storing a set of post-synchronization operations issued by a driver to a graphics memory, wherein a host processor executes the driver;
    generating and pre-processing a marker in a graphics pipeline;
    issuing a flush indicator from the graphics pipeline when the marker exits the graphics pipeline; and
    processing the set of post-synchronization operations by an execution module in a graphics processor in response to the flush indicator signaling to the execution module that the maker has exited the graphics pipeline after one or more synchronization points of workload are to be reached or completed during workload processing.

11. The method of claim 10, further including:
    storing a token to the graphics memory after the set of post-synchronization operations is stored to the graphics memory; and
    discontinuing processing of the set of post-synchronization operations if the token is encountered in the graphics memory.

12. The method of claim 10, further including obtaining the set of post-synchronization operations from one of a pipe control command or an atomics command.

13. At least one non-transitory computer readable storage medium comprising a set of instructions which, if executed by a computing device, cause the computing device to:
    store a set of post-synchronization operations to be issued by a driver to a graphics memory, wherein a host processor is to execute the driver;
    generate and pre-process a marker in a graphics pipeline;

issue a flush indicator from the graphics pipeline when the marker exits the graphics pipeline; and process the set of post-synchronization operations by an execution module in a graphics processor in response to the flush indicator signaling to the execution module that the marker exiting the graphics pipeline after one or more synchronization points of workload are to be reached or completed during workload processing.

14. The at least one non-transitory computer readable storage medium of claim 13, wherein the instructions, if executed, cause a computing device to:

store a token to the graphics memory after the set of post-synchronization operations is stored to the graphics memory; and discontinue processing of the set of post-synchronization operations if the token is encountered in the graphics memory.

15. The at least one non-transitory computer readable storage medium of claim 13, wherein the instructions, if executed, cause a computing device to obtain the set of post-synchronization operations from one of a pipe control command or an atomics command.

16. An apparatus comprising:

a host processor to execute a driver, the driver to issue a set of post-synchronization operations;

a memory module, implemented at least partly in one or more of configurable logic or fixed functionality logic hardware, to store a set of post-synchronization operations to a graphics memory; and a graphics processor including:

a graphics pipeline, implemented at least partly in one or more of configurable logic or fixed functionality logic hardware, to generate and pre-process a marker, and to issue a flush indicator when the marker exits the graphics pipeline; and an execution module, implemented at least partly in one or more of configurable logic or fixed functionality logic hardware, to process the set of post-synchronization operations in response to the flush indicator signaling to the execution module that the marker has exited the graphics pipeline, wherein the set of post-synchronization operations are to be processed after one or more synchronization points of workload are to be reached or completed during workload processing.

17. The apparatus of claim 16, wherein the memory module is to store a token to the graphics memory after the set of post-synchronization operations is stored to the graphics memory, and the execution module is to discontinue processing of the set of post-synchronization operations if the token is encountered in the graphics memory.

18. The apparatus of claim 16, further including a graphics hardware front end to obtain the set of post-synchronization operations from one of a pipe control command or an atomics command.

19. The apparatus of claim 18, wherein the atomics command is to either include the set of post-synchronization operations as inline data or accept the set of post-synchronization operations as indirect data from one or more preloaded implicit registers.

20. The apparatus of claim 18, wherein the atomics command is to include a return bit and the graphics hardware front end is to either return read data to an originator of the atomics command or store read data to an implicit register if the return bit is set.

21. The apparatus of claim 16, wherein further including a graphics hardware front end to consider one or more commands having a special bit indication as being the set of post-synchronization operations.

22. The apparatus of claim 16, wherein the set of post-synchronization operations is to include one or more atomic operations.

23. The apparatus of claim 22, wherein the one or more atomic operations is to include a read operation, a modify operation and a write operation.

24. The apparatus of claim 23, wherein the modify operation is to include one or more of an Add, Subtract, Increment, Decrement, Max, Min, AND, OR, XOR, or Compare operation.

25. The apparatus of claim 16, further including a graphics hardware front end to prepare an atomics command for immediate processing if the atomics command does not have a special bit indication corresponding to post-synchronization processing.

* * * * *